(12) United States Patent
Lee

(10) Patent No.: US 10,043,120 B2
(45) Date of Patent: Aug. 7, 2018

(54) TRANSLUCENT MARK, METHOD FOR SYNTHESIS AND DETECTION OF TRANSLUCENT MARK, TRANSPARENT MARK, AND METHOD FOR SYNTHESIS AND DETECTION OF TRANSPARENT MARK

(71) Applicant: Moon Key Lee, Seoul (KR)

(72) Inventor: Moon Key Lee, Seoul (KR)

( * ) Notice: Subject to any disclaimer, the term of this patent is extended or adjusted under 35 U.S.C. 154(b) by 0 days.

(21) Appl. No.: 15/522,031

(22) PCT Filed: Oct. 26, 2015

(86) PCT No.: PCT/KR2015/011341
§ 371 (c)(1),
(2) Date: Apr. 26, 2017

(87) PCT Pub. No.: WO2016/068560
PCT Pub. Date: May 6, 2016

(65) Prior Publication Data
US 2017/0316297 A1  Nov. 2, 2017

(30) Foreign Application Priority Data

Oct. 27, 2014 (KR) .................. 10-2014-0146512
Nov. 10, 2014 (KR) .................. 10-2014-0155756
Dec. 25, 2014 (KR) .................. 10-2014-0189216

(51) Int. Cl.
*G06K 19/06* (2006.01)
*G06T 11/60* (2006.01)
*G06K 9/46* (2006.01)
*G06T 7/90* (2017.01)

(52) U.S. Cl.
CPC ...... *G06K 19/06103* (2013.01); *G06K 9/4604* (2013.01); *G06K 19/06037* (2013.01); *G06T 7/90* (2017.01); *G06T 11/60* (2013.01); *G06K 2019/06225* (2013.01); *G06T 2207/10024* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 2004/0041030 A1 | 3/2004 | Nimura et al. | |
| 2011/0296327 A1 | 12/2011 | Kang et al. | |
| 2013/0037619 A1 | 2/2013 | Key | |
| 2013/0112760 A1* | 5/2013 | Schory | G06K 19/06037 235/494 |

FOREIGN PATENT DOCUMENTS

WO   WO 2006/114827 A1   11/2006

OTHER PUBLICATIONS

Korean Intellectual Property Office; International Search Report in International Patent Application No. PCT/KR2015/011341 (dated Feb. 2, 2016).

* cited by examiner

*Primary Examiner* — Kristy A Haupt
(74) *Attorney, Agent, or Firm* — Leydig Voit & Mayer

(57) ABSTRACT

A method of generating a semi transparent QR code in which a QR code image and an ordinary color background image are synthesized, and a QR code detection method of separating a QR code and a normal color image from an image obtained by capturing a semi transparent QR code are disclosed.

18 Claims, 3 Drawing Sheets

TRANSLUCENT MARK, METHOD FOR SYNTHESIS AND DETECTION OF TRANSLUCENT MARK, TRANSPARENT MARK, AND METHOD FOR SYNTHESIS AND DETECTION OF TRANSPARENT MARK

CROSS-REFERENCE TO PRIOR APPLICATIONS

This Application is the U.S. National Phase of International Patent Application PCT/KR2015/011341, filed Oct. 26, 2015, which claims priority to Korean Patent Application No. 10-2014-0146512, filed Oct. 27, 2014, Korean Patent Application No. 10-2014-0155756, filed Nov. 10, 2014, and Korean Patent Application No. 10-2014-0189216, filed Dec. 25, 2014, each of which is incorporated by reference.

TECHNICAL FIELD

The present invention relates to a technique for semi-transparently or transparently synthesizing a QR code image on a color background image.

BACKGROUND ART

QR code, smart phone, mobile device, camera, image processing, wearable computer, glasses-type display, virtual reality, augmented reality, mark

DETAILED DESCRIPTION OF THE INVENTION

Technical Problem

Embodiments disclosed herein relate to the improvement of visual marks such as a QR code. A QR code is a type of two-dimensional bar code. For example, a related URL is printed on an advertisement of a magazine as a QR code, and a user can photograph and recognize the QR code by using a camera of a smartphone, and QR access the URL indicated by the QR code with the smart phone. Also, the QR code may be used to synthesize an image of augmented reality by detecting a posture of the camera. Such existing QR codes are opaque, and thus, hide background images. In order to minimize the occlusion of the background image, the conventional QR codes are printed small on a part of the background image. Thus, the user has to approach the QR code in order to capture the QR code with the camera. The QR code may be photographed from a distance if it is designed to be large, but in this case, the QR code may cover a large portion of the background image.

The objective of the present invention is to provide a semi-transparent or a transparent QR code, and an image processing device capable of composing and detecting the semi-transparent or the transparent QR code in such a way that the QR code may be semi-transparently or transparently composed on a background image to be designed to be large and not to conceal the background image.

Technical Solution

In order to achieve the above object, the semi-transparent or the transparent mark according to the present invention is characterized in that a variation width of brightness of an ordinary color background image is adjusted and a blue QR code is synthesized thereon, wherein a variation width of brightness of the blue QR code is set to be higher than a variation width of brightness of a blue component image of the background image. A method of detecting the semi-transparent or the transparent QR code is characterized by detecting the QR code by binarizing a blue component image of an image obtained by capturing the semi-transparent or the transparent QR code. Also, the method is characterized in that the QR code is detected by stably performing such binarization by binarizing the blue component image after calibrating the blue component image in which a red component image and a green component image are darkened.

Advantageous Effects of the Invention

By using the semi-transparent or the transparent mark according to the present invention, a QR code can be attached to a surrounding environment without generating adverse effects for a user so as to be utilized as a marketing means or as a marker for augmented reality or virtual reality.

BEST MODE

Embodiment 1

The objective of the present invention is to provide a semi-transparent QRQR code in which a monochrome QR code is semi-transparently synthesized on a color background image in order to solve the problem that a conventional QR code is opaque and hides a background image. Specifically, a method of generating a semi-transparent QR code image according to the present invention is as follows.

(Step 1-1) An ordinary color background image is decomposed into three primary color component images. That is, three gray images (a red component image, a green component image, and a blue component image) are generated from the color image. For example, the gray image may be a 256-step image having the darkest pixel value of 0 and the brightest pixel value of 255.

(Step 1-2) The white pixel value of the monochrome binary QR code image is converted to 64 and the black pixel value is converted to −64. The range of pixel values of the converted image is −64 to 64. The range (brightness difference) of pixel values is referred to as a contrast in the present invention. That is, the range of pixel distribution is 128. It is preferable that the absolute values of the binary values (−64, 64) be equal and the signs are different.

(Step 1-3) The pixel values of the blue component gray image obtained in Step 1-1 are converted such that a difference B (the range of pixel distribution, that is, the contrast) between the darkest pixel value and the brightest pixel value of the blue component gray image obtained in Step 1-1 is sufficiently less than the pixel range size Q (128) of the QR code image obtained in Step 1-2, wherein B+Q<255.

In other words, the sum of the contrasts of the two images should be less than 255, which is the maximum possible contrast of the image.

On in this way, the synthesized image can be printed or outputted to a display.

The above condition, B+Q<255, denotes that the pixel range of the composite image of the blue component image of the normal image and the QR code image should be less than 255.

For example, if the value of the darkest pixel of the blue component gray image is 0 and the value of the brightest pixel is 255, a new pixel value obtained by multiplying all pixel values by 60/255 is taken as the pixel value of the darkened new image.

When all pixels are multiplied by the constant (60/255), the entire image is darkened, so that the original color image is darkened.

In order to maintain the brightness of the original color image as much as possible in the conversion process of this step, it is desirable that first the average pixel value of the blue component gray image be obtained, and a pixel having a pixel value greater than the average pixel value be reduced in brightness and a pixel having a pixel value less than the average pixel value be increased in brightness.

Figure 1:
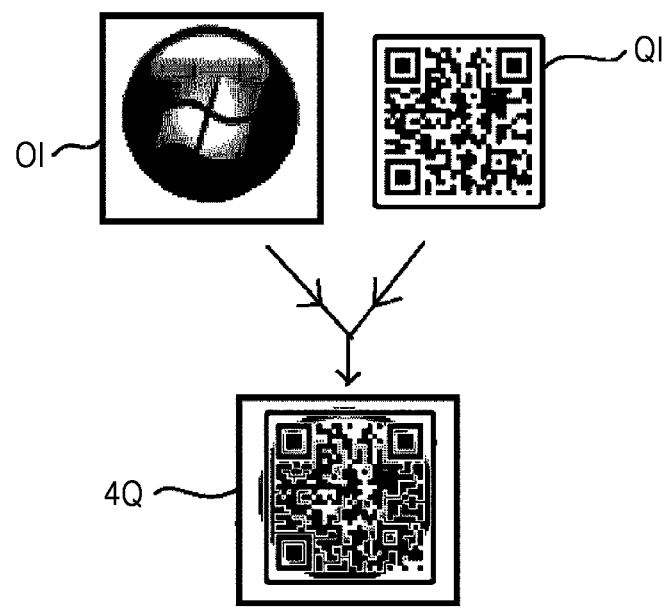
FIG. 1 is a diagram for describing an operation of synthesizing two images.
Figure 2:
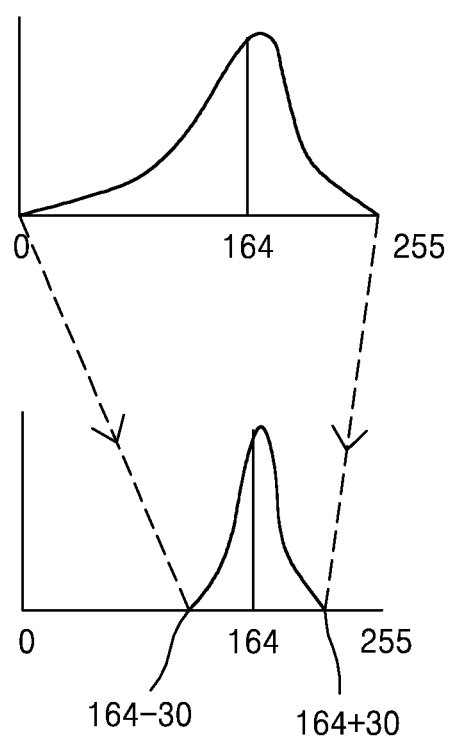
FIG. 2 is a view showing a change in histogram of a pixel value.

FIG. 2 shows a histogram of the pixel values of the images before and after the conversion.

In FIG. 2, the pixel range of the blue component gray image before conversion is 0 to 255 and the average pixel value is 164.

When this image goes through Step 1-3, the image is converted into an image having a pixel range of 164−30 to 164+30.

Figure 3:
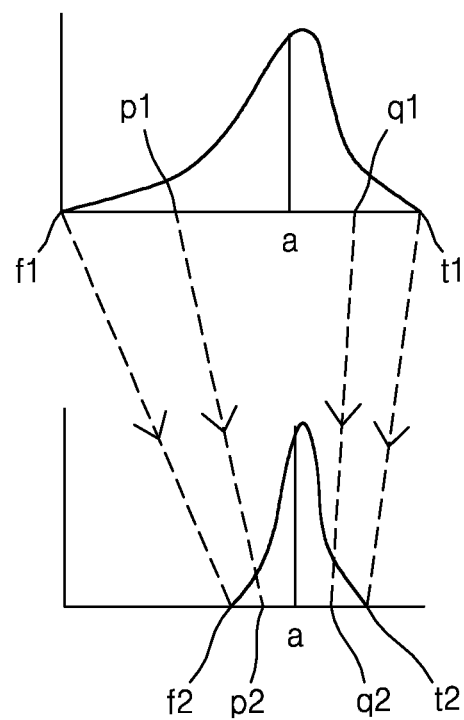
FIG. 3 is a view of a generalized version of FIG. 2.

FIG. 3 is a generalized view of FIG. 2.

FIG. 3 shows a histogram of pixel values of an image generated by converting an image having a pixel value range of f1 to t1 and an average pixel value of a to an image having a pixel value range of f2 to t2.

The arbitrary pixel value p1, q1 before conversion is converted into p2, q2, respectively, and the concrete value thereof can be obtained from the following proportional expression.

(Non-proportional nonlinear transformations may be used. Herein, the proportional expression is an example of possible transformations).

$$a-f1:p1-f1=a-f2:p2-f2$$

$$t1-a:q1-a=t2-a:q2-a$$

The QR code image may be detected by binarizing the image obtained by capturing the synthesized image by limiting the distribution range (contrast) of the pixel values of the blue component image of the background image to be less than the distribution range (contrast) of the pixel values of the QR code image.

If the distribution range (for example, 60) of the pixel value of the blue component image of the background image is less than the distribution range (for example, 128) of the pixel value of the QR code image, Step 1-3 is passed.

These specific numbers 255, 128, and 60 are values for convenience of explanation, and values may be different when the present invention is actually implemented.

Also, other algorithms in addition to the proportional equation described above may be used.

As shown above, the contrast of the background image may be reduced by using the same proportional expression or algorithm for the entire background image, but the reduction of the contrast may also be performed by using a proportional expression or an algorithm that is most suitable for each pixel of the background image.

For example, in the combined image of the blue component image of the background image and the QR code image, the contrast of a boundary line of the background image may be reduced so that the contrast of a boundary line of a cell of the QR code is greater than the contrast of the boundary line of the background image in a certain region near the boundary line.

Here, the cell of the QR code denotes a rectangular area in the smallest unit of the same pixel value indicating the information of the QR code.

It is preferable that the above certain region near the boundary line be equal to or greater than the size of the cell of the QR code (the smaller one of horizontal and vertical sides of the square of the cell).

When the contrast is adjusted as shown above, each pixel of the synthesized image may be easily binarized by searching the histogram of the pixels in the region having the cell size of the QR code around the pixel.

(Step 1-4) An image of the addition of the QR code image (the image having the pixel range of 128) obtained in Step 1-2 and the blue component image (the image having the pixel range of 60) obtained in Step 1-3 is obtained.

Here, the addition image of the two input images denotes an image whose pixel value at (x,y) corresponds to a value obtained by adding the pixel values at (x,y) of the two input images.

(Step 1-5) The distribution of the pixel values of the addition image obtained in the above Step 1-4 is adjusted to be within a range (for example, 0 to 255) that is displayable on the display or a range that is printable.

For example, when the range of pixel values of the blue component image obtained in Step 1-3 is (255-60) to 255 and the range of pixel values of the QR code image is −64 to 64, the range of pixel values of the addition image obtained by synthesizing the two images for each pixel is (255−60−64) to (255+64).

Since the maximum brightness of the gray image is 255 and the maximum value (255+64) of the synthesized pixel value is out of the range, a suitable constant has to be added to all the pixels of the synthesized addition image to shift the range of the pixel.

That is, it is preferable to add −64 to all pixels of the addition image so that 255+64 is equal to or less than 255.

Similarly, when the range of pixel values of the blue component image obtained in Step 1-3 is 0 to 60 and the range of pixel values of the QR code image is −64 to 64, the range of pixel values of the synthesized addition image is (0-64) to (60+64).

Since the minimum brightness of the gray image is 0 and the minimum value (0-64) of the synthesized pixel value is out of the range, a suitable constant has to be added to all the pixels of the addition image to translate the range of the pixel.

That is, it is preferable to add 64 to all pixels so that 0-64 is equal to or greater than zero.

(Step 1-6) A new color image composed of the red component image and the green component image generated in Step 1-1 and the new blue component image synthesized in Step 1-4 is generated. The new color image composed as such is a semi-transparent QR code image according to the present invention.

In this case, if the green component image or the red component image is excessively bright or the contrast is high, the brightness or the contrast may be reduced before the image is composed, in order to easily detect the QR code in the composed image.

Further, if a contrast is excessively high in a specific part of the blue component image obtained in the above Step 1-1 (that is, when too bright an area and too dark an area are in contact with each other), it is also possible to further reduce the contrast only in that part.

For example, only that part can be replaced with a histogram equalized image.

In this case, the contrast-limited adaptive histogram equalization (CLAHE), (https://en.wikipedia.org/wiki/Adaptive_histogram_equalization), or a similar method can be used as a histogram equalizing algorithm.

Also, the contrast of the image can be changed through other image processing such as gaussian blur, rather than through the histogram equalization.

The semi-transparent QR code image may be printed on paper in color or outputted to a color display, such as a liquid crystal display (LCD) or a beam projector, and the outputted image may be captured by a camera of a smartphone. The captured image may be analyzed via an image processing program of the smart phone, and the QR code image and the background image may be detected as follows.

(Step 2-1) The semi-transparent QR code color image is captured with a color camera.

(Step 2-2) The captured color image is decomposed into three primary color component images. That is, a red component image, a green component image, and a blue component image of the captured image are generated.

(Step 2-3) A composite image having a pixel value corresponding to a pixel value (weighted average) obtained by synthesizing pixel values of the red component image and the green component image generated in Step 2-2 is generated.

For example, when it is assumed that a pixel value at a position (x,y) is R(x,y) in the red component image, and a pixel value at a position (x,y) is G(x,y) in the green component image, a pixel value at a position (x,y) is R(x, y)*w1+G(x, y)*w2 in the composite image.

Herein, w1 and w2 are weighted average composite coefficients, where 0<=w1+w2<=1. ("*" denotes multiplication). Since the sensitivity of green is the highest among the three primary colors, it is preferable that green have a greater weight. That is, it is preferable that w1<w2.

It is preferable to determine specific values of w1 and w2 by considering results of detecting the QR code by going through the steps (Steps 2-1 through 2-6) of the present invention by using w1 and w2. In detail, the values of w1 and w2, whereby the detection is most advantageous, may be selected. For example, values satisfying w1=⅙ and w2=⅓ may be used.

(Step 2-4) A difference image is obtained by subtracting the image synthesized in Step 2-3 from the blue component image generated in Step 2-2. Here, the difference image is an image whose pixel value corresponds to a pixel value obtained by subtracting the corresponding pixel values of the two input images.

For example, if the two input images are I1 and I2, and the difference image of the two images is D, the pixel value D(x, y) of the difference image D at a position (x, y) is I1(x, y)−I2(x, y), which is obtained by subtracting the pixel value of I2 at the corresponding position (x, y) from the pixel value of I1 at the corresponding position (x, y).

A blue color filter of an image sensor not only transmits blue light but also transmits some of red light and green light, and thus, in order to erase the faint red and green objects (noise) in the captured blue component image, the difference is applied.

Or the difference may be applied, because the camera's auto white balance function can change the original color to a different color. Through the difference, only the QR code image combined with the pure blue object image may remain in the blue component image.

(Step 2-5) A QR code image is generated by binarizing the difference image obtained in Step 2-4.

The difference image obtained in the above Step 2-4 is an image synthesized such that the brightness range (60) of the blue object is adjusted not to be greater than the brightness range (128) of the QR code image in Steps (1-1) to (1-6). Thus, the QR code image can be easily obtained by binarizing the difference image.

Since these values of the brightness range (60, 128) are only an example for convenience of explanation, different values may be used in actual implementation.

(Step 2-6) The blue component image of the background image, from which the QR code is removed, may be generated by multiplying the QR code image obtained in Step 2-5 by an appropriate weight to darken the QR code image, and subtracting the said darkened QR code image from the difference image obtained in Step 2-4.

When the blue component image having appropriately increased brightness is synthesized with the color image composed of the red component and the green component images, obtained in Step 2-2, the background image from which the QR code is removed may be generated.

If the QR code image is not detected as a result of the above Steps (2-1) to (2-6), it is because of the significant variation of brightness of the normal background image in Step 1-1. (That is, the contrast of image is too high.)

In this case, it is necessary to reduce the variation of the brightness of the background image and then generate the semi-transparent QR code image.

For example, it is preferable that the semi-transparent QR code image be synthesized by reducing the range of brightness variation of the red and green component images of the normal color background image of Step 1-1 by performing process as Step (1-3).

In the above description, the reason that the QR code image is synthesized with the blue component image of the background image is because the color blue is the least sensitive to human eyes so that the QR code is most inconspicuous in the synthesized image. In other words, when the image is generated by synthesizing the QR code with the blue component image, the background image is most similar to the original image and the QR code image is the faintest, when the image is seen by the human eye.

Other mark images may be used rather than the QR code image that is synthesized with the normal background image. For example, an image, such as a logo, an icon, a marker for augmented reality, a barcode, or a letter, may be synthesized rather than the QR code image.

The synthesized image may be analyzed by the above method to detect a marker or a QR code, and a three-dimensional relative position and a direction between the camera and the QR code or the marker may be calculated, so that a virtual object may be synthesized with a captured image to have perspective. In this way, the video see-through type augmented reality system may be constructed.

In this case, it is desirable to delete the QR code or the marker from the captured image and synthesize the virtual object.

The user can see a more natural virtual reality image since the QR code or the marker is erased in the background of the synthesized image of the virtual object.

Such a system may be configured by using a camera of a smart phone or may be configured by using a camera attached to an eye glasses-type display.

To use the blue QR code or marker in an optical see-through type augmented reality system (such as Microsoft's Hollolens system or Google Glass), it is necessary to attach a yellow filter (a filter that transmits red and green light and blocks blue light) onto a glasses-type display including a camera for photographing in a eye direction.

In this case, the yellow filter may not be attached in front of the camera. That is, the yellow filter has to be installed only in front of the eye of the wearer of the eyeglasses-type display.

The yellow filter serves to block the blue component of the QR code image. Here, it is preferable to use a filter that transmits some of blue color, rather than the filter transmitting only the yellow color, so that the user may see a more natural color.

It is preferable that such a yellow filter eyeglasses be a variable filter that is normally transparent and is changed to yellow when a blue QR code is detected in an image captured by a camera.

Such a variable color filter can be implemented, for example, as an LCD-type transparent display. Also, it is preferable that only a portion in the wearer's field of view, which is occupied by the QR code, be changed to the yellow color.

The blue QR code can be densely attached to, for example, a wall, a ceiling and a floor of a room in a multiple number, and the glasses-type display may be worn to implement augmented reality throughout the room.

In addition, a robot, such as a cleaning robot, can recognize the QR code with a camera thereof to recognize a location thereof, thereby performing self-running.

This blue QR code is less conspicuous to a human eye than the conventional black QR code, and thus, it can alleviate the visual discomfort to the naked eye. Also, the QR code may further be hidden by semi-transparently compositing the blue QR code with a normal photograph or drawing.

Embodiment 2

The specific color component image (for example, the blue component image) of the semi-transparent QR code image generated in the first embodiment is a composite image of the QR code image and the blue component image of the normal image.

Also, the color component images (for example, the red and green component images) excluding the specific color component of the semi-transparent QR code image are normal images.

An image (referred to as a first image in the present embodiment), which includes a negative image (denoting an image whose white and black pixels are swapped) of the QR code image used in the semi-transparent QR code image (referred to as a second image in the present embodiment), as a specific color component image (for example, a blue component image), may be generated.

All of the pixel values of the color component images (for example, red and green component images) of the specific color component image of the first image is zero.

That is, the first image is a blue image, and the content thereof is a QR code image that is a black and white inverted image.

If the first image and the second image are alternately and fast displayed on a display, humans cannot see the QR code image and can only see the normal image.

However, when the display is captured with a high-speed camera, the QR code image can be captured and the QR code can be detected by using the image processing means.

The method of detecting the QR code in the captured image is the same as the method described in the first embodiment. That is, the QR code image can be obtained by binarizing the blue component image of the captured image.

The QR code, which is not visible to a person, can be outputted to a TV screen so that a user can capture the QR code with a smart phone to obtain information related to a program currently being broadcast.

For example, the user can get information related to a product shown on a screen which is currently being broadcast.

An augmented reality image can be synthesized with video as a background by synthesizing QR code with each frame image of the video to be outputted on a TV screen as a background image, and the synthesized frames can be outputted on the TV screen.

This is superior to the conventional augmented reality image having the still image as its background. For example, an image whereby a shark in a TV jumps out of a screen may be synthesized into an augmented reality image.

The present embodiment is similar to 'Stereo image-based image processing system' of Korean Patent Registration No. 10-2012-0109581, which is a prior patent of the applicant of the present invention. However, the mark of the present embodiment has an advantage that it is invisible to the human eye.

In contrast, the technique of Registration No. 10-2012-0109581 has a problem in that the mark image hides the normal image when a screen is seen by a naked eye, because the mark image and the normal image are outputted alternately.

Embodiment 3

The first image and the second image of the second embodiment may be outputted as images to be seen by a right eye and a left eye, respectively, on a three-dimensional display of a polarization scheme.

The polarization-type three-dimensional display has a display screen divided into a plurality of areas of slender horizon lines, wherein different polarizing filters are attached to each of the even-numbered areas and the odd-numbered areas of the plurality of areas.

When an image that is to be shown to the right eye is outputted to the even-numbered areas, and an image that is to be shown to the left eye is outputted to the odd-numbered areas in the display, and a user wears a glasses having different polarization filters for the left and right eyes, the left and right eyes can see different images.

Another example of the polarization-type three-dimensional display is a beam projector used in the three-dimensional theater.

The beam projector uses a method of alternately projecting onto a screen an image to be shown to the left eye and an image to be shown to the right eye of stereo images by using different polarizations.

By using this beam projector, the first image and the second image of the second embodiment may be alternately projected onto the screen with different polarizations.

The QR code of the first image may be easily detected by attaching a polarizing filter which transmits only polarized light of the first image, to the front of the camera lens, and capturing the 3d screen using this polarization method.

A person who does not wear the polarized glasses can see both the first image and the second image, and thus, cannot see the QR code image. In other words, the person who does not wear the polarized glasses can only see the original normal image without the QR code.

The invention claimed is:

1. An image processing device comprising:
   an image generator configured to generate a color image including a mark image and a normal image,
   wherein the image processing device is configured to output the mark image in a semi transparent manner,
   wherein a contrast of a boundary line of the mark image of a specific color component image of the color image is greater than a contrast of a boundary line of the normal image of the specific color component image of the color image,
   wherein the boundary line of the normal image is a boundary line distributed within a predetermined distance from the boundary line of the mark image, and
   the predetermined distance is greater than a half of a smaller one of a horizontal size or a vertical size of a cell at the boundary line of the mark image,
   wherein the contrast of the boundary line of the normal image is selectively controlled with respect to the specific color component image among a plurality of color component images.

2. The image processing device according to claim 1, wherein the specific color is one of three primary colors.

3. The image processing device according to claim 1, wherein the contrast of the mark image of a remaining color component image excluding the specific color component image from the color image is smaller than the contrast of the normal image of the remaining color component images excluding the specific color component image from the color image, or
   wherein the mark image is not included in the remaining color component image excluding the specific color component image from the color image.

4. The image processing device according to claim 1, wherein the image generator generates the color image by synthesizing the mark image on the specific color component image of the normal image and not synthesizing the mark image on the other color component image of the normal image.

5. The image processing device according to claim 1, wherein a contrast of the specific color component image of the normal image is less than a contrast of the mark image.

6. The image processing device according to claim 1, wherein the normal image includes three primary color component images, the mark image includes a single color component image, and
   wherein the mark image is synthesized on one color component image selected from the three primary color component images of the normal image.

7. The image processing device according to claim 1, wherein the specific color component image of the normal image corresponds to a blue component image, and
   wherein the color image includes a red component image of the normal image, a green component image of the normal image and the blue component image on which the mark image is synthesized.

8. A method of synthesizing a semi transparent mark image, the method comprising:
   reducing a contrast of a specific color component image of a normal image to be less than or equal to a contrast of a mark image;
   synthesizing the mark image onto the specific color component image of the normal image of which the contrast is reduced; and
   adjusting a brightness or a contrast of the synthesized image to be in a range that is displayable on a display or a range that is printable,
   wherein the normal image comprises a plurality of color component images including the specific color component image, and
   wherein the contrast of the normal image is selectively reduced with respect to the specific color component image among a plurality of color component images.

9. The method according to claim 8, wherein a maximum value and a minimum value of pixel values of the mark image have same absolute value and different signs.

10. The method according to claim 8, wherein the synthesizing of the mark image onto the normal image the contrast of which is reduced comprises adding pixel values of the normal image of which the contrast is reduced to pixel values of the mark image.

11. A method of detecting semi transparent mark, the method comprising:
    extracting a specific color component image of a semi transparent mark image including a mark image of the specific color and a normal image; and
    binarizing the extracted specific color component image,
    wherein the extracted specific color component image includes the mark image and the normal image,
    wherein a contrast of a boundary line of the mark image of the specific color component image is greater than a contrast of a boundary line of the normal image of the specific color component image,
    wherein the contrast of the boundary line of the normal image is selectively controlled with respect to the specific color component image among a plurality of color component images.

12. The method according to claim 11, wherein the extracting the specific color component image includes obtaining an image obtained by subtracting an image obtained by darkening the color component image excluding the specific color component image from the specific color component image.

13. An image processing device comprising:
    an image generator configured to generate a color image, the color image including a first image including a mark image as a specific color component image, and a second image including a negative image of the mark image as the specific color component image and a normal image,
    wherein the image processing device is configured to output the mark image in a transparent manner by alternately outputting the first image and the second image on a display or by simultaneously or alternately outputting the first image and the second image with different polarizations on the display.

14. The image processing device according to claim 13, wherein a contrast of the mark image included in the first image is equal to a contrast of the negative mark image included in the second image.

15. The image processing device according to claim 13, wherein the specific color is one of the three primary colors.

16. A method of synthesizing a transparent mark image, the method comprising:

converting a mark image into a specific color image to generate a first image;

converting a negative image of the mark image into the specific color image, and synthesizing the converted image with the specific color image of a normal image;

adjusting a brightness or contrast of the synthesized image so that the synthesized image is displayable on a display;

adjusting a brightness or contrast of the mark image of the first image to be equal to a brightness or contrast of the negative image of the mark included in the synthesized image whose brightness or contrast is adjusted; and generating a second image from the synthesized image the brightness or contrast of which is adjusted and a remaining color component image of the normal image.

17. A method of detecting a transparent mark, the method comprising:

acquiring a first image from the first image and a second image outputted on a display;

extracting a specific color component image from the acquired first image; and binarizing the extracted specific color component image, wherein the first image includes a mark image of a specific color, and the second image includes a negative image of the mark image of the specific color and a normal image, and the first image and the second image are alternately outputted on the display or outputted on the display with different polarizations.

18. The method according to claim 17, wherein, the acquiring the first image selects an image periodically including a specific color as the first image by searching a color change of the acquired image or selects only a specific polarized image as the first image.

* * * * *